(12) United States Patent
Lee et al.

(10) Patent No.: US 10,877,853 B2
(45) Date of Patent: Dec. 29, 2020

(54) DATA STORAGE DEVICE AND OPERATION METHOD OPTIMIZED FOR RECOVERY PERFORMANCE, AND STORAGE SYSTEM HAVING THE SAME

(71) Applicant: SK hynix Inc., Gyeonggi-do (KR)

(72) Inventors: Se Ho Lee, Gyeonggi-do (KR); Min Gu Kang, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 126 days.

(21) Appl. No.: 16/151,422

(22) Filed: Oct. 4, 2018

(65) Prior Publication Data
US 2019/0310921 A1    Oct. 10, 2019

(30) Foreign Application Priority Data
Apr. 9, 2018   (KR) .................. 10-2018-0041106

(51) Int. Cl.
| | |
|---|---|
| *G06F 11/00* | (2006.01) |
| *G06F 11/14* | (2006.01) |
| *G06F 12/02* | (2006.01) |
| *G06F 3/06* | (2006.01) |

(52) U.S. Cl.
CPC ........ *G06F 11/1469* (2013.01); *G06F 3/0616* (2013.01); *G06F 3/0647* (2013.01); *G06F 3/0673* (2013.01); *G06F 11/1448* (2013.01); *G06F 12/0253* (2013.01); *G06F 2201/805* (2013.01); *G06F 2201/82* (2013.01); *G06F 2212/1044* (2013.01)

(58) Field of Classification Search
CPC .... G06F 3/0616; G06F 3/0647; G06F 3/0673; G06F 3/064; G06F 3/0652; G06F 3/0679; G06F 3/061; G06F 12/0253; G06F 2212/1044; G06F 2212/7205; G06F 2201/805; G06F 2201/82
See application file for complete search history.

(56) References Cited

U.S. PATENT DOCUMENTS

| | | | | |
|---|---|---|---|---|
| 2014/0115233 | A1* | 4/2014 | Goss ................... | G06F 12/0246 711/103 |
| 2014/0229767 | A1* | 8/2014 | Kang .................. | G06F 11/1435 714/22 |
| 2018/0307496 | A1* | 10/2018 | Ke ...................... | G06F 11/2268 |

FOREIGN PATENT DOCUMENTS

| | | |
|---|---|---|
| KR | 101738965 | 5/2017 |
| KR | 1020170091389 | 8/2017 |

\* cited by examiner

*Primary Examiner* — Marc Duncan
(74) *Attorney, Agent, or Firm* — IP & T Group LLP

(57) ABSTRACT

A data storage device may include: a storage unit comprising a storage comprising a storage area divided into a plurality of blocks, and a controller configured to control a data input/output operation on the storage according to a request of a host device, collect information on a block, of the plurality of blocks, involved in a background operation which is performed while power is supplied, store the collected information as hint information, and resume a background operation started before a sudden power-off, based on the hint information, when power is resupplied after the sudden power-off.

15 Claims, 7 Drawing Sheets

DATA STORAGE DEVICE AND OPERATION METHOD OPTIMIZED FOR RECOVERY PERFORMANCE, AND STORAGE SYSTEM HAVING THE SAME

CROSS-REFERENCE TO RELATED APPLICATION

The present application claims priority under 35 U.S.C. § 119(a) to Korean application number 10-2018-0041106, filed on Apr. 9, 2018, in the Korean Intellectual Property Office, which is incorporated herein by reference in its entirety.

BACKGROUND

1. Technical Field

Various embodiments of the present invention generally relate to a semiconductor integrated device. Particularly, the embodiments relate to a data storage device and operation method optimized for recovery performance, and a storage system including the same.

2. Related Art

Since a flash memory has high capacity, a nonvolatile characteristic, low price, small power consumption, and provides high data processing speed, the demand for the flash memory is continuously increasing.

A storage medium using the flash memory may include a solid state drive (SSD) type storage medium replacing a hard disk, an embedded type storage medium used as an embedded memory, and a mobile type storage medium. A flash-memory-based storage medium may be applied to various electronic devices such as a vehicle navigation system, a black box, and generally various electronic devices which mainly perform multimedia data processing.

Such a data storage device requires a sudden power off recovery (SPQR) function of preventing data loss or drive or partition damage, even though power is cut off while data are written or read.

For example, when power is resupplied to reactivate the system after a sudden power-off, the system is required to return to the state before the sudden power-off, and the data before the sudden power-off are required to be retained without loss.

SUMMARY

In an embodiment, a data storage device may include: a storage comprising a storage area divided into a plurality of blocks, and a controller configured to control a data input/output operation on the storage according to a request of a host device, collect information on a block, of the plurality of blocks, involved in a background operation which is performed while power is supplied, store the collected information as hint information, and resume a background operation started before a sudden power-off, based on the hint information, when power is resupplied after the sudden power-off.

In an embodiment, there is provided an operation method of a data storage device which includes a storage unit including a storage area divided into a plurality of blocks and a controller for controlling data exchange of the storage unit. The operation method may include the step of: collecting information on a block, of the plurality of blocks, involved in a background operation which is performed while power is supplied, and storing the collected information as hint information, receiving power again, after a sudden power-off, and resuming the background operation, started before the sudden power-off, based on the hint information.

In an embodiment, a storage system may include: a host device, and a data storage device comprising a storage having a storage area divided into a plurality of blocks and a controller configured to control a data input/output operation on the storage according to a request of the host device. Wherein the controller collects information on a block, of the plurality of blocks, involved in a background operation which is performed while power is supplied, stores the collected information as hint information, and resumes the background operation started before the sudden power-off, based on the hint information, when power is resupplied after the sudden power-off.

In an embodiment, a memory system may include: a memory device including memory blocks, and a controller configured to control the memory device to perform a background operation on the memory blocks while storing background operation information, and control the memory device to resume, when the background operation is interrupted due to a sudden power off, the interrupted background operation on the memory blocks according to the background operation information. Wherein the background operation information includes information on a target block of the interrupted background operation, and the background operation is one of a garbage collection operation and a valid page counting operation.

DETAILED DESCRIPTION

Figure 1:
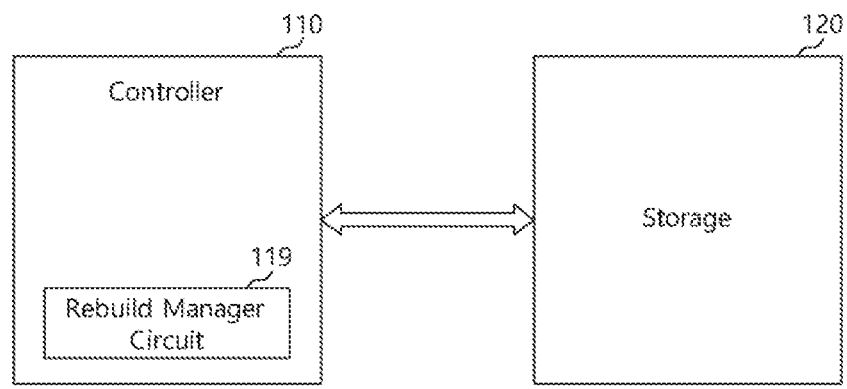
FIG. 1 is a diagram illustrating a data storage device in accordance with an embodiment.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. It is noted that, throughout the specification, reference to "an embodiment" or the like is not necessarily to only one embodiment, and different references to "an embodiment" or the like are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, a data storage device and operation method optimized for recovery performance, and a storage system including the same according to embodiments of the present disclosure is described below with reference to the accompanying drawings.

FIG. 1 is a configuration diagram illustrating a data storage device in accordance with an embodiment.

Referring to FIG. 1, the data storage device 10 in accordance with the present embodiment may include a controller 110 and a storage 120.

The controller 110 may control the storage 120 in response to a request of a host device. For example, the controller 110 may program data to the storage 120 according to a program (write) request of the host device. Furthermore, the controller 110 may provide data stored in the storage 120 to the host device in response to a read request of the host device.

The storage 120 may write data or output written data according to control of the controller 110. The storage 120 may include a volatile or nonvolatile memory. By way of example and not limitation, the storage 120 depending on an embodiment may be implemented with a memory device selected from various nonvolatile memory devices such as an EEPROM (Electrically Erasable and Programmable ROM), NAND flash memory, Nor flash memory, PRAM (Phase-Change RAM), ReRAM (Resistive RAM) FRAM (Ferroelectric RAM) and S-MRAM (Spin Torque Transfer Magnetic RAM). The storage 120 may include a plurality of dies, a plurality of chips or a plurality of packages. Furthermore, the storage 120 may include single-level cells each configured to store one-bit data or multi-level cells each configured to store multi-bit data.

The storage 120 may have a hierarchy structure composed of a page including a plurality of memory cells, a block including one or more pages, a plane including one or more memory blocks (blocks), and a die including one or more planes. Read and write (program) operations may be performed on a page basis, and an erase operation may be performed on a block basis, for example. In order to improve a data input/output speed, the unit of read or written data may be decided according to the purpose of the data storage device 10 or the like.

Although not illustrated in FIG. 1, a buffer memory may be provided within or externally to the controller 110. The buffer memory may serve as a space for temporarily storing data when the data storage device 10 performs an operation of writing or reading data in connection with the host device.

The controller 110 may include a rebuild manager circuit 119. The rebuild manager circuit 119 may rebuild data stored in the storage 120 through an operation of recovering a map table for the storage 120 and counting the number of valid pages, when power is resupplied after power supply to the data storage device 10 was suddenly cut off.

The rebuild manager circuit 119 may collect background operation information representing a memory block involved in a background operation of the data storage device 10 while power is normally supplied to the data storage device 10. In an embodiment, the background operation may include a garbage collection (GC) operation for efficiently processing valid pages and invalid pages, a valid page count operation for counting the number of valid pages for each block in order to select a source block used for a GC operation, a wear-leveling operation for averaging the wear levels of the memory cells, and a read claim operation. In an embodiment, the background operation information collected by the rebuild manager circuit 119 may include at least information on a block in which a GC operation is being performed and information on a block of which valid pages are being counted.

In the flash memory device, the program operation may be performed on a page basis, but the erase operation may be performed on a block basis. Since the flash memory device does not support an overwrite operation, an erase operation before a write operation needs to be performed on a block basis. As data are continuously written to the flash memory device, valid data may be scattered across the entire flash memory device. Thus, the GC operation needs to be performed in order to secure a storage space to which data can be written, that is, free blocks.

The GC operation may be performed through a process of selecting a victim block, moving valid pages of the selected victim block to an arbitrary block (target block), and erasing the victim block of which the valid pages were moved.

When a sudden power-off occurs while the controller 110 is counting the valid pages of the storage 120, information on the valid page count may be lost. The time required for counting the valid pages may be proportional to the capacity of the storage 120. Further, when power is resupplied after the sudden power-off occurred during the valid page count operation, the rebuild manager circuit 119 of the controller 110 needs to count the number of valid pages for all the blocks of the storage 120 again from the beginning.

In the present embodiment, the rebuild manager circuit 119 may collect background operation information used for the background operation while power is normally supplied, as hint information. The hint information may include information on a block in which the GC operation is being performed and information on a block of which valid pages are being counted. When power is resupplied after the sudden power-off, the controller 110 may resume the background operation based on the collected hint information, thereby minimizing the recovery time of the storage 120.

That is, the rebuild manager circuit 119 may store information on the progress of the background operation as the hint information at the moment of interruption of the background operation due to the sudden power-off. Then, when power is resupplied, the rebuild manager circuit 119 does not need to restart the background operation required for activating the storage 120 from the beginning but may resume the interrupted background operation based on the hint information stored therein.

Figure 2:
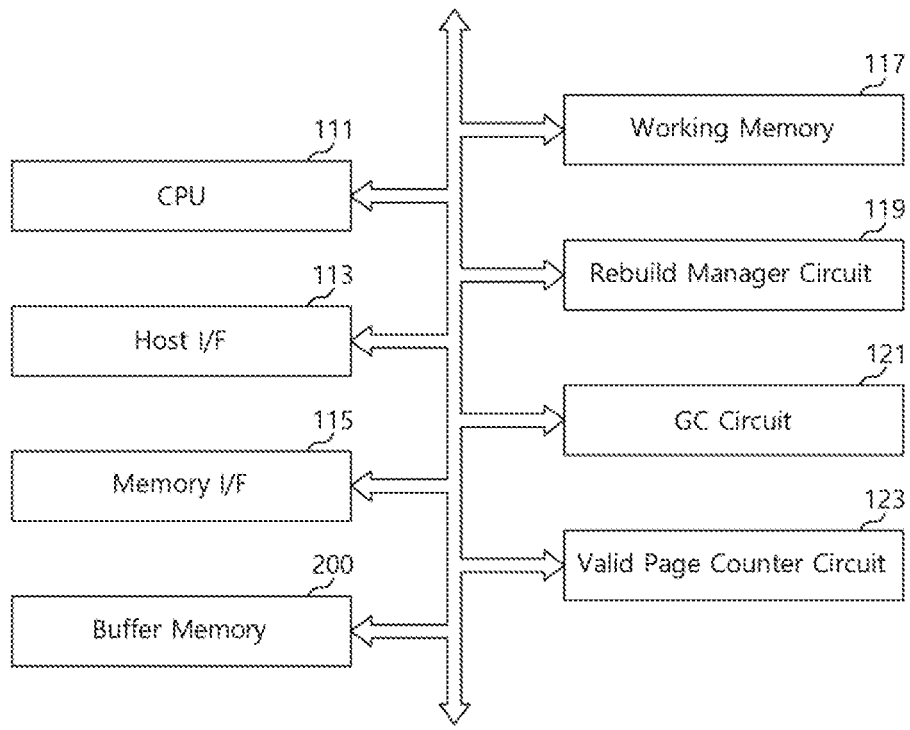
FIG. 2 is a diagram illustrating a controller in accordance with an embodiment.

FIG. 2 is a configuration diagram illustrating the controller in accordance with the present embodiment.

Referring to FIG. 2, the controller 110 in accordance with the present embodiment may include a central processing unit (CPU) 111, a host interface (I/F) 113, a memory I/F 115, a working memory 117, the rebuild manager circuit 119, a GC circuit 121 and a valid page counter circuit 123.

The CPU 111 may be configured to transfer various pieces of control information to the host I/F 113, the memory I/F 115 and the working memory 117, the control information being required for reading or writing data from or to the storage 120. In an embodiment, the CPU 111 may be operated according to firmware which is provided for various operations of the data storage device 10. In an embodiment, the CPU 111 may have a function of a flash translation layer (FLT) for performing an address mapping or wear-leveling operation for managing the storage 120. Depending on an implementation, the CPU 111 may detect an error of data read from the storage 120, and correct the detected error.

The host I/F 113 may provide a communication channel for receiving a command and clock signal from the host device (host processor) and controlling data input/output according to control of the CPU 111. In particular, the host I/F 1130 may provide a physical connection between the host device and the data storage device 10. Furthermore, the host I/F 113 may interface the data storage device 10 in accordance with a bus format of the host device. The bus format of the host device may include one or more of standard I/F protocols such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The memory I/F 115 may provide a communication channel for transmitting/receiving signals between the controller 110 and the storage 120. The memory I/F 115 may write data to the storage 120 according to control of the CPU, the data being temporarily stored in the buffer memory 200. Furthermore, the memory I/F 115 may transfer data read from the storage 120 to the buffer memory 200 to temporarily store the data.

The working memory 117 may store program codes required for an operation of the controller 110, for example, firmware or software. Furthermore, the working memory 117 may store code data used by the program codes.

The CPU 111 may process the background operation at a predefined timing, for example, while power is normally supplied to the data storage device 10 to process a request of the host device, or the CPU 111 performs its own process or stays in an idle state.

The rebuild manager circuit 119 may rebuild data stored in the storage 120 through operations of recovering a map table for the storage 120 and counting the number of valid pages, when power is resupplied after power supply to the data storage device 10 was suddenly cut off.

The rebuild manager circuit 119 may collect background operation information representing a memory block involved in a background operation of the data storage device 10 while power is normally supplied to the data storage device 10, as hint information. In an embodiment, the hint information may include one or more of first information corresponding to information on a block in which the GC operation is being performed and second information corresponding to information on a block of which valid pages are being counted.

In an embodiment, the hint information collected by the rebuild manager circuit 119 may be stored in a meta data region of the storage 120.

Figure 3:
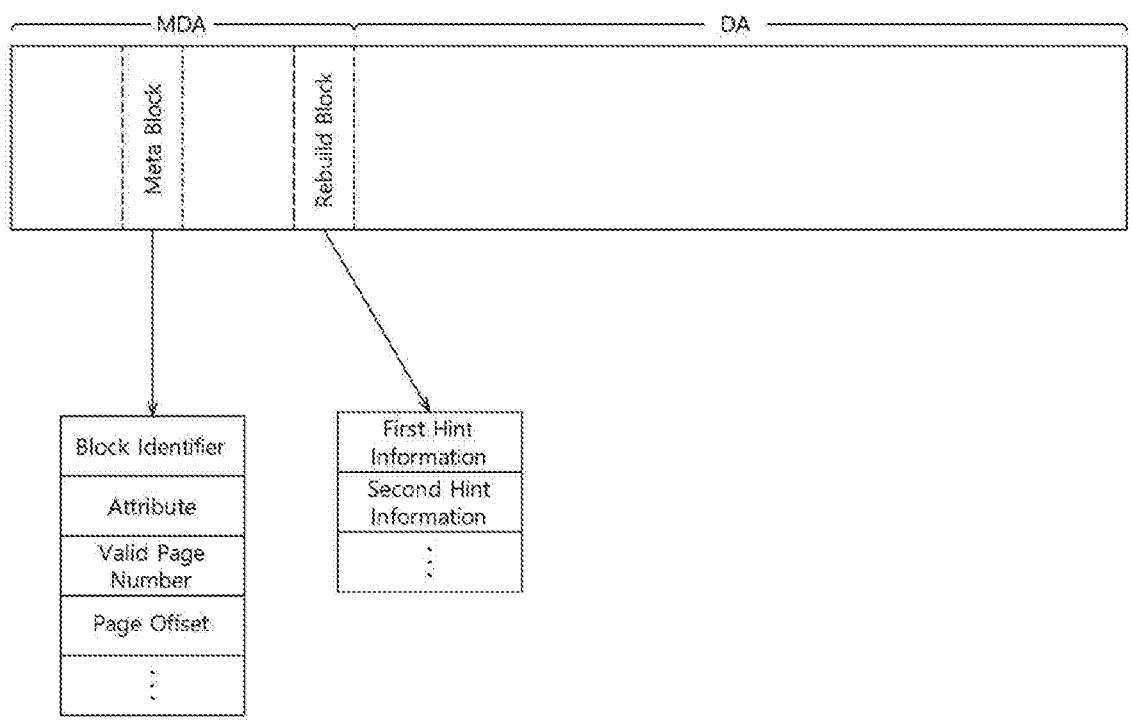
FIG. 3 is a diagram describing data stored in a memory device in accordance with an embodiment.

FIG. 3 is a diagram for describing data stored in the memory device in accordance with a present embodiment.

Referring to FIG. 3, the storage 120 may be divided into a meta data area MDA and a data area DA.

The meta data area MDA may be used to store important information required for the controller 110 to manage the storage 120. The data area DA may be used to store user data.

The meta data area MDA may include a meta block, and additionally include a root block, a page map block and a map log block. The root block may be used to store information on the meta block. The page map block may be used to store mapping information between a logical page and a physical page. The map log block may be used to store update information of the page map block in a log format.

In an embodiment, the meta block may store information containing the attribute, valid page number and page offset of a block, using the block identifier of the corresponding block as an index. The attribute of the block may indicate the state information of the block, for example, information on whether the block is an open block, closed block or free block.

The open block may be a memory block which is being used to process a write request. The closed block may be a block having no empty spaces capable of storing data or a block which is set not to store data. The free block may be a block to which data can be written.

The valid page number may indicate the number of valid pages included in the corresponding block.

The page offset may indicate offset information of a page which is to be written at the next time in the corresponding block.

In an embodiment, the meta data area MDA may further include a rebuild block. The rebuild block may store the first and second hint information collected by the rebuild manager circuit 119.

As described above, the first hint information may include information on a block involved in the GC operation which is performed while power is normally supplied. The second hint information may include information on a block involved in the valid page count operation which is performed while power is normally supplied.

When power is resupplied after a sudden power-off, the rebuild manager circuit 119 may resume the background operation, which was interrupted due to the sudden power-off, based on the hint information collected in the meta data area MDA. In an embodiment, as power is resupplied, the rebuild manager circuit 119 may refer to the first hint information, for example, information on a block in which the GC operation was being performed at the time of sudden power off, and perform the valid page count operation on the corresponding block.

When the valid page count operation for the block in which the GC operation was being performed before the sudden power-off is completed, the rebuild manager circuit 119 may refer to the second hint information, for example, the information on the block in which the valid page count operation was being performed at the moment of the sudden power off and resume the valid page count operation on the corresponding block.

When the valid page count operations for the blocks based on the first and second hint information are completed, the valid page count operation may be performed on the other blocks which the number of valid pages has not yet been counted according to a preset order.

The GC circuit 121 may perform the GC operation to secure free blocks to which data can be written. In the present embodiment, the GC circuit 121 can secure free blocks through a process of selecting a victim block, moving valid pages of the selected victim block to an arbitrary block (target block), and erasing the victim block of which the valid pages were moved. However, the present embodiment is not limited thereto.

The valid page counter circuit 123 may be configured to count the number of valid pages in each of the blocks. The number of valid pages for each block may be referred to when a source block to be used for a GC operation is selected or block attribute decision or wear-leveling is performed.

Figure 4:
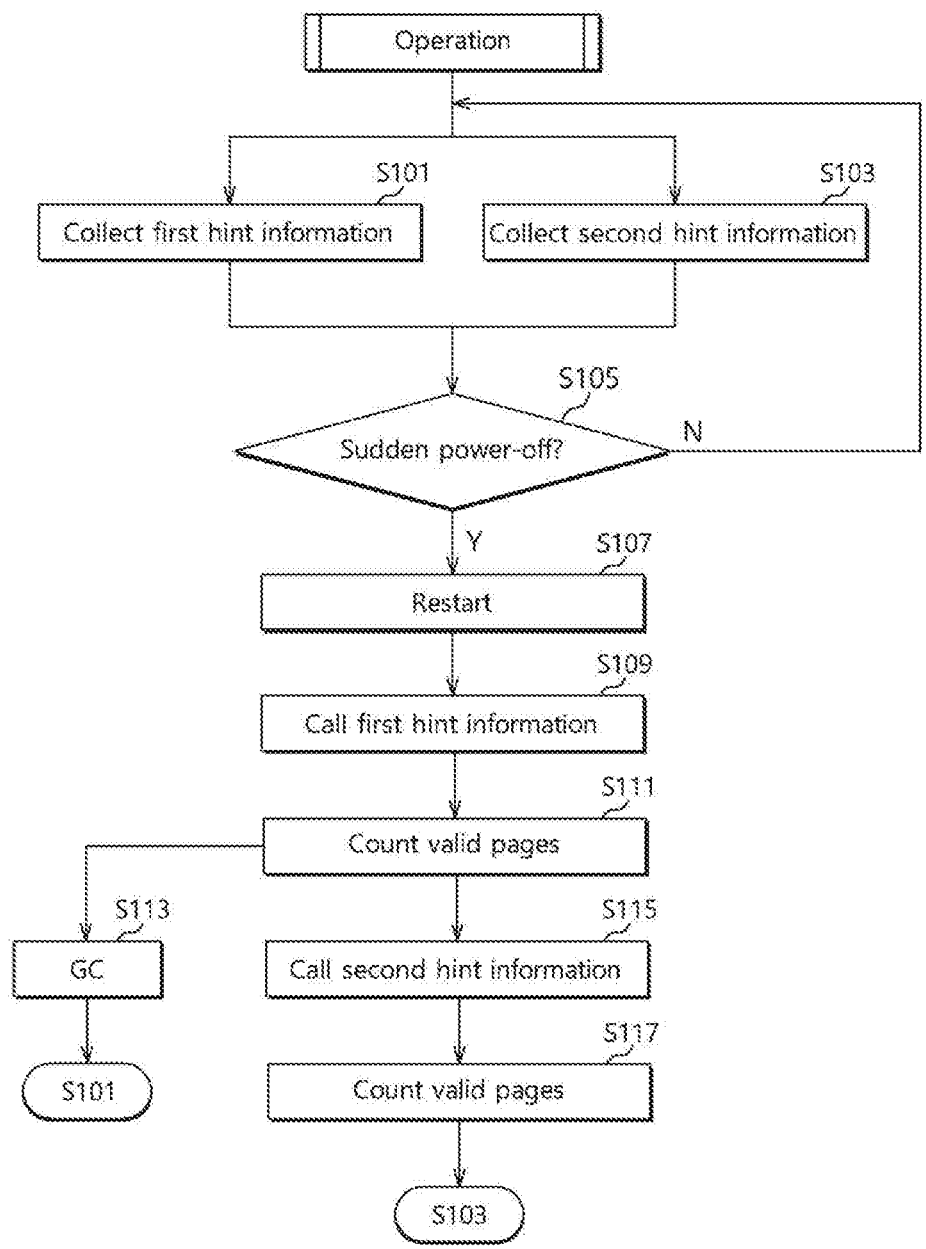
FIG. 4 is a flowchart describing an operation method of a data storage device in accordance with an embodiment.

FIG. 4 is a flowchart for describing an operation method of a data storage device in accordance with an embodiment.

The rebuild manager circuit 119 of the controller 110 may collect background operation information on a block involved in a background operation of the data storage device 10 while power is normally supplied to the data storage device 10, as the hint information. In an embodiment, as the hint information, the rebuild manager circuit 119 may collect the first information corresponding to information on a block in which a GC operation is being performed at step S101, and collect the second information corresponding to information on a block of which valid pages are being counted at step S103.

In an embodiment, the hint information collected by the rebuild manager circuit 119 may be stored in the meta data area of the storage 120.

However, while the data storage device 10 is operated, power supply may be suddenly cut off at step S105. If power supply is not suddenly cut of ("N" at step S105), the rebuild manager circuit 119 may continuously collect the hint information based on the background operation of the data storage device 10 while power is supplied to the data storage device 10 (at steps S101 and S103).

Then, when power is resupplied after the sudden power off ("Y" at step S105), the data storage device may be restarted at step S107.

In an embodiment, as power is resupplied, the rebuild manager circuit 119 may reactivate the storage 120 through a preset recovery procedure. For example, the rebuild manager circuit 119 may rebuild data stored in the storage 120 through an operation of recovering a map table for the storage 120 and counting the number of valid pages.

In order to count the number of valid pages, the rebuild manager circuit 119 may refer to the first hint information stored in the meta data area of the storage 120 at step S109, and count the number of valid pages in the block in which a GC operation was being performed at the moment of the sudden power-off at step S111.

Then, the GC operation which was interrupted due to the sudden power-off may be resumed at step S113. Since a sudden power-off may occur even while the GC operation is being performed at step S113 after the power was resupplied, the first hint information on the block in which the GC operation is being performed at step S113 needs to be collected at step S101.

Then, the rebuild manager circuit 119 may refer to the second hint information stored in the meta data area of the storage 120 at step S115, and resume a valid page count operation on a block of which valid pages were counted at the moment of the sudden power-off at step S117. Even at this time, the second hint information may be collected in order to prepare for a sudden power-off which may occur any time (step S103).

As such, when power is resupplied, the storage 120 can be rapidly rebuilt based on the information on the blocks in which the GC operation and the valid page count operation were being performed at the moment of the sudden power-off.

Figure 5:
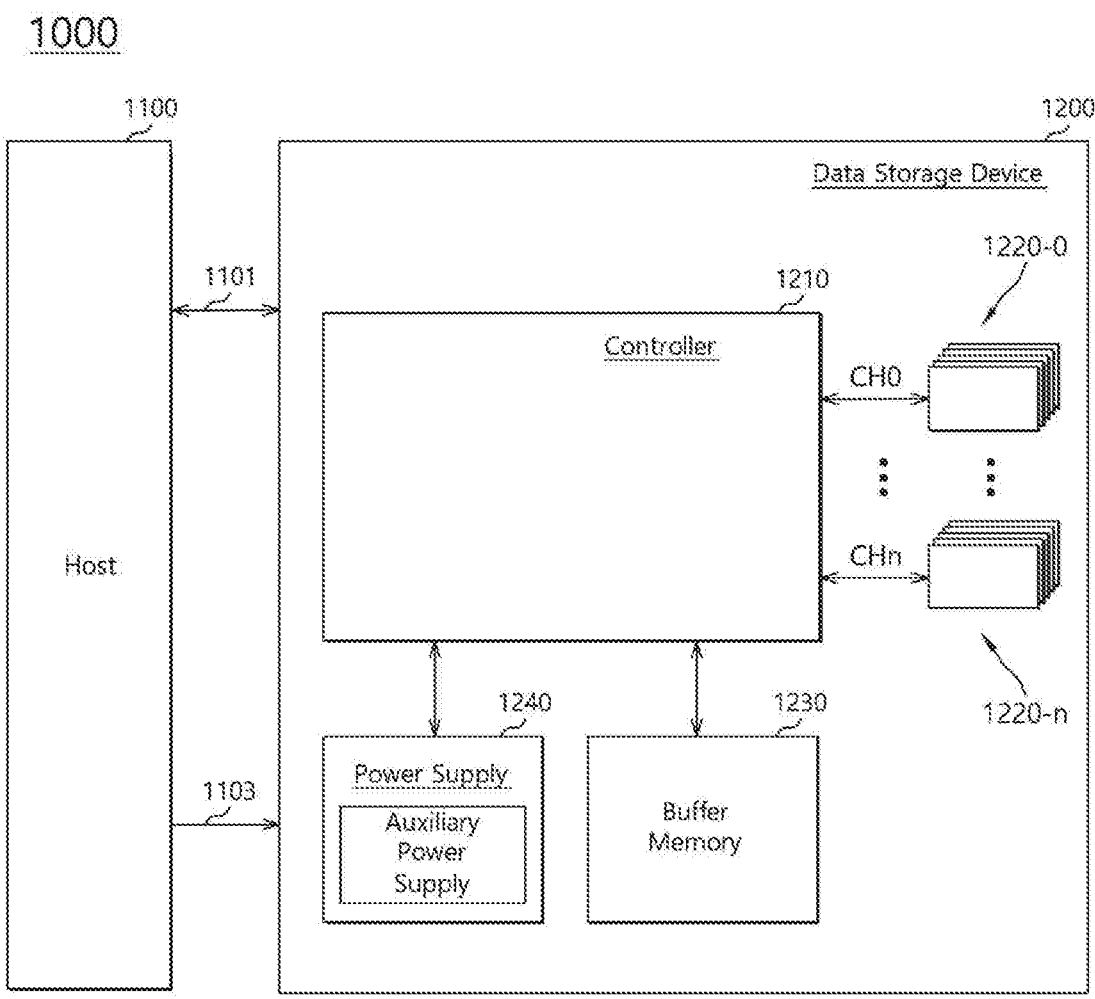
FIG. 5 is a diagram illustrating a data processing system including a solid state drive (SSD) in accordance with an embodiment.

FIG. 5 is a diagram illustrating a data processing system 1000 including a solid state drive (SSD) 1200 in accordance with an embodiment. Referring to FIG. 5, the data processing system 1000 may include a host device 1100 and the SSD 1200.

The SSD 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the SSD 1200. The controller 1210 may include a host interface, a control component, a random access memory used as a working memory, an error correction code (ECC) component, and a memory interface. In an embodiment, the controller 1210 may configured as controller 110 comprising the rebuild manager circuit 119 as shown in FIGS. 1 to 3.

The host device 1100 may exchange a signal with the SSD 1200 through the signal connector 1101. The signal may include a command, an address, data, and the like. The host interface 1211 may interface the host device 1100 and the SSD 1200 according to the protocol of the host device 1100.

The controller 1210 may analyze and process the signal received from the host device 1100. The controller 1210 may control operations of internal function blocks according to firmware or software for driving the SSD 1200.

The ECC component may detect an error of the data read from at least one of the nonvolatile memory devices 1220-0 to 1220-n. If a detected error is within a correctable range, the ECC component may correct the detected error.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the SSD 1200. The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1103, to the inside of the SSD 1200. The power supply 1240 may include an auxiliary power supply. The auxiliary power supply may supply power to allow the SSD 1200 to be normally terminated when a sudden power-off occurs. The auxiliary power supply may include large capacity capacitors.

The signal connector 1101 may be configured as any of various types of connectors depending on an interface scheme between the host device 1100 and the SSD 1200.

The power connector 1103 may be configured as any of various types of connectors depending on a power supply scheme of the host device 1100.

Figure 6:
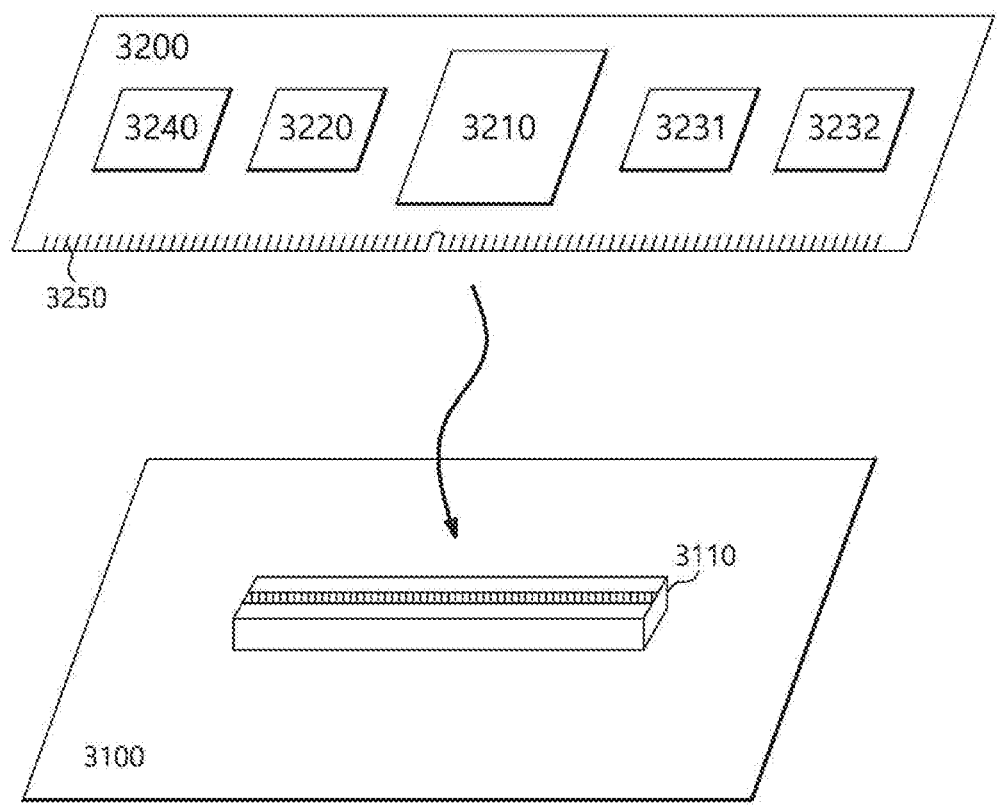
FIG. 6 is a diagram illustrating a data processing system including a memory system in accordance with an embodiment.

FIG. 6 is a diagram illustrating a data processing system 3000. Referring to FIG. 6, the data processing system 3000 may include a host device 3100 and the memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 comprising the rebuild manager circuit 119 as shown in FIGS. 1 to 3.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and the like, and power may be transferred between the host device 3100 and the memory system 3200. The connection terminal 3250 may be configured as any of various types depending on an interface scheme between the host device 3100 and the memory system 3200. The connection terminal 3250 may be disposed on any side of the memory system 3200.

Figure 7:
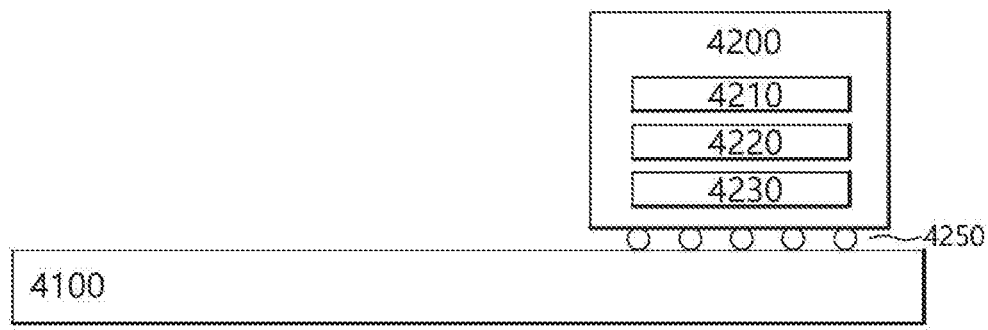
FIG. 7 is a diagram illustrating a data processing system including a memory system in accordance with an embodiment.

FIG. 7 is a diagram illustrating a data processing system 4000 including a memory system 4200 in accordance with an embodiment. Referring to FIG. 7, the data processing system 4000 may include a host device 4100 and the memory system 4200.

The host device 4100 may be configured in the form of a board such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 comprising the rebuild manager circuit 119 as shown in FIGS. 1 to 3.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 8:
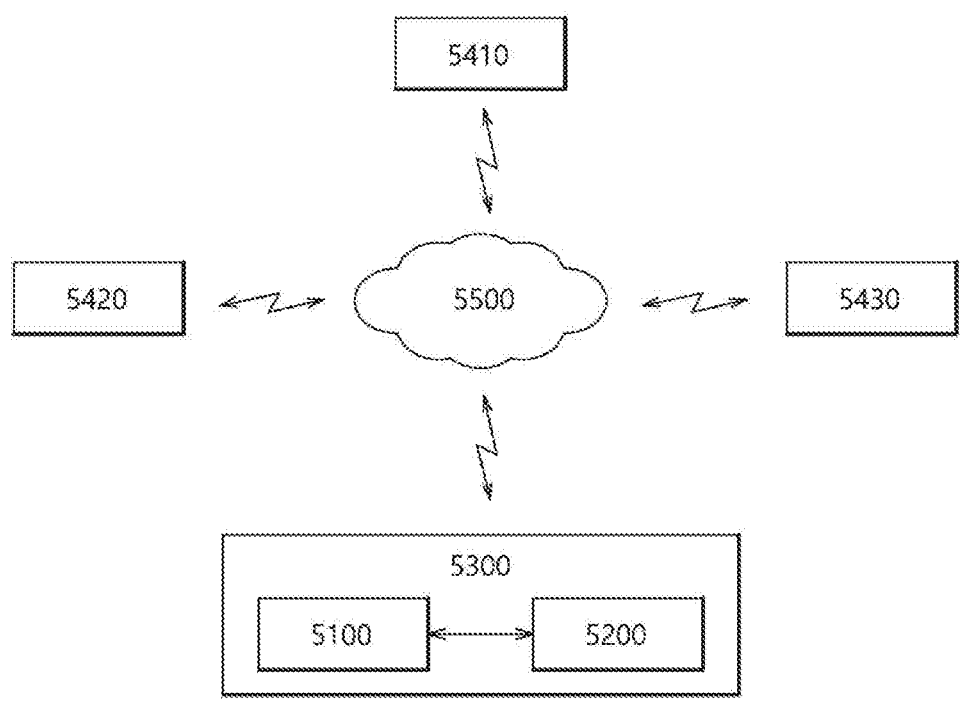
FIG. 8 is a diagram illustrating a network system including a memory system in accordance with an embodiment.

FIG. 8 is a diagram illustrating a network system 5000 including a memory system 5200 in accordance with an embodiment. Referring to FIG. 8, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be configured as data storage device 10 shown in FIG. 1, the SSD 1200 shown in FIG. 5, the memory system 3200 shown in FIG. 6 or the memory system 4200 shown in FIG. 7.

Figure 9:
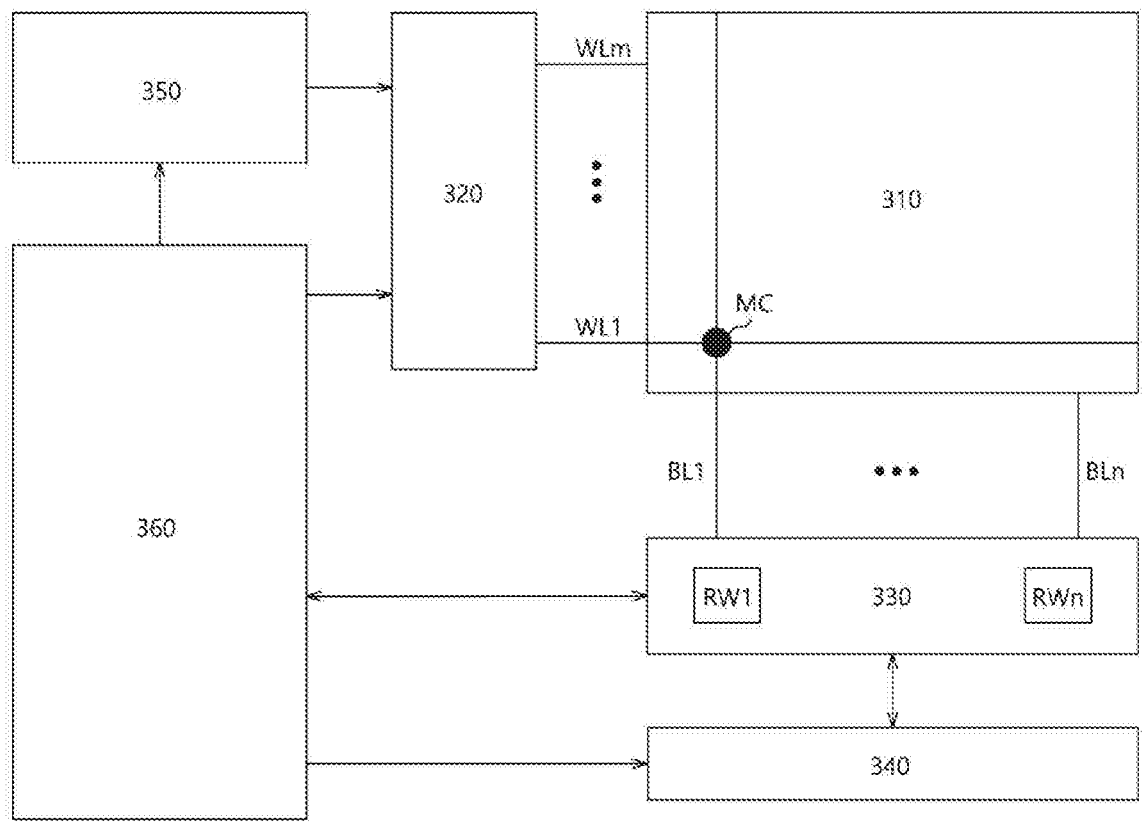
FIG. 9 is a block diagram illustrating a nonvolatile memory device included in a memory system in accordance with an embodiment.

FIG. 9 is a block diagram illustrating a nonvolatile memory device 300 included in a memory system in accordance with an embodiment. Referring to FIG. 9, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

The memory cell array 310 may comprise a three-dimensional memory array, which has a direction perpendicular to the flat surface of a semiconductor substrate. Moreover, the three-dimensional memory array may include a structure including NAND strings in which at least memory cell is located in a vertical upper portion of another memory cell.

The structure of the three-dimensional memory array is not limited to the above-described configuration. Moreover, it is apparent that the memory array structure can be selectively applied to a memory array structure formed in a highly integrated manner with horizontal directionality as well as vertical directionality.

While various embodiments have been described above, it will be understood by those skilled in the art in light of this disclosure that the embodiments described herein reflect exemplary configurations that may be modified or varied in numerous ways. Accordingly, the data storage device, operating method thereof, and the storage system including the data storage device described herein are not limited to the described embodiments. Rather, the present invention encompasses all embodiments, alternatives and variations as may fall within the scope of the claims.

What is claimed is:

1. A data storage device comprising:
a storage comprising a storage area divided into a plurality of blocks; and
a controller configured to control a data input/output operation on the storage according to a request of a host device, collect information on a block, of the plurality of blocks, involved in a background operation which is performed while power is supplied, store the collected information as hint information, and resume a background operation started before a sudden power-off, based on the hint information, when power is resupplied after the sudden power-off,
wherein the background operation comprises a garbage collection (GC) operation, a valid page count operation for each of the plurality of blocks, a wear-leveling operation, and a read reclaim operation.

2. The data storage device of claim 1, wherein the hint information comprises information on a block, of the plurality of blocks, in which the GC operation was being performed at the time of the sudden power-off and information on a block, of the plurality of blocks, of which valid pages were being counted at the time of the sudden power-off.

3. The data storage device of claim 1, wherein, when power is resupplied after the sudden power-off, the controller recovers a map table for the storage, and counts the number of valid pages.

4. The data storage device of claim 3, wherein the controller counts the number of valid pages using the hint information including information on a block, of the plurality of blocks, in which a GC operation was being performed at the time of the sudden power-off and information on a block, of the plurality of blocks, of which valid pages were being counted at the time of the sudden power-off.

5. The data storage device of claim 1, wherein the hint information is stored in a meta data area of the storage.

6. An operation method of a data storage device which includes a storage including a storage area divided into a plurality of blocks and a controller for controlling data exchange of the storage, the operation method comprising:
collecting information on a block, of the plurality of blocks, involved in a background operation which is performed while power is supplied, and storing the collected information as hint information;
receiving power again, after a sudden power-off; and
resuming the background operation, started before the sudden power-off, based on the hint information,
wherein the background operation comprises a garbage collection (GC) operation, a valid page count operation for each of the plurality of blocks, a wear-leveling operation, and a read reclaim operation.

7. The operation method of claim 6, wherein the hint information comprises information on a block, of the plurality of blocks, in which the GC operation was being performed at the time of the sudden power-off and information on a block, of the plurality of blocks, of which valid pages were being counted at the time of the sudden power-off.

8. The operation method of claim 6, further comprising recovering a map table for the storage when power is resupplied after the sudden power-off.

9. The operation method of claim 6, wherein the hint information is stored in a meta data area of the storage.

10. A storage system comprising:
a host device; and
a data storage device comprising a storage having a storage area divided into a plurality of blocks and a controller configured to control a data input/output operation on the storage according to a request of the host device,
wherein the controller collects information on a block, of the plurality of blocks, involved in a background operation which is performed while power is supplied, stores the collected information as hint information, and resumes the background operation started before the sudden power-off, based on the hint information, when power is resupplied after the sudden power-off,
wherein the background operation comprises a garbage collection (GC) operation, a valid page count operation for each of the plurality of blocks, a wear-leveling operation, and a read reclaim operation.

11. The storage system of claim 10, wherein the hint information comprises information on a block, of the plurality of blocks, in which the GC operation was being performed at the time of the sudden power-off and information on a block, of the plurality of blocks, of which valid pages were being counted at the time of the sudden power-off.

12. The storage system of claim 10, wherein, when power is resupplied after the sudden power-off, the controller recovers a map table for the storage, and counts the number of valid pages.

13. The storage system of claim 12, wherein the controller counts the number of valid pages using the hint information including information on a block, of the plurality of blocks, in which a GC operation was being performed at the time of the sudden power-off and information on a block, of the plurality of blocks, of which valid pages were being counted at the time of the sudden power-off.

14. The storage system of claim 10, wherein the hint information is stored in a meta data area of the storage.

15. A memory system comprising:
a memory device including memory blocks; and
a controller configured to:
control the memory device to perform a background operation on the memory blocks while storing background operation information; and
control the memory device to resume, when the background operation is interrupted due to a sudden power off, the interrupted background operation on the memory blocks according to the background operation information,
wherein the background operation information includes information on a target block of the interrupted background operation, and
wherein the background operation comprises a garbage collection operation, a valid page counting operation for each of the plurality of blocks, a wear-leveling operation, and a read reclaim operation.

\* \* \* \* \*